(12) United States Patent
Wohlrab

(10) Patent No.: US 6,851,942 B2
(45) Date of Patent: Feb. 8, 2005

(54) PLATEN CLAMPING MECHANISM FOR AN INJECTION-MOLDING MACHINE

(75) Inventor: Walter Wohlrab, Weissenburg (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 80 days.

(21) Appl. No.: 10/344,024

(22) PCT Filed: Aug. 21, 2001

(86) PCT No.: PCT/EP01/09660
§ 371 (c)(1),
(2), (4) Date: Feb. 6, 2003

(87) PCT Pub. No.: WO02/16105
PCT Pub. Date: Feb. 28, 2002

(65) Prior Publication Data
US 2003/0137082 A1 Jul. 24, 2003

(30) Foreign Application Priority Data
Aug. 21, 2000 (DE) .......................... 100 40 819

(51) Int. Cl.⁷ ............................................. B29C 45/64
(52) U.S. Cl. .................... 425/190; 425/214; 425/451.7; 425/589; 425/595
(58) Field of Search ............................... 425/190, 214, 425/589, 590, 595, 451.7

(56) References Cited

U.S. PATENT DOCUMENTS 3,669,599 A 6/1972 Snider et al.
3,890,081 A * 6/1975 Grundmann ............. 425/450.1
3,975,133 A * 8/1976 Nussbaumer ............. 425/451.2
5,135,385 A 8/1992 Fukuzawa et al.
6,210,144 B1 * 4/2001 Mailliet et al. ............. 425/589

FOREIGN PATENT DOCUMENTS

| DE | 26 31 804 A | 1/1978 |
| DE | 42 43 735 A | 7/1993 |
| DE | 195 44 329 A1 | 6/1996 |
| EP | 0 383 935 A1 | 8/1990 |
| EP | 0 381 107 B1 | 6/1994 |
| EP | 0 544 903 B1 | 4/1997 |
| EP | 0 824 058 A | 2/1998 |

* cited by examiner

Primary Examiner—James P. Mackey
(74) Attorney, Agent, or Firm—Henry M. Feiereisen

(57) ABSTRACT

To displace a moving mold mounting plate (3), a threaded spindle drive is inserted between the moving mold mounting plate (3) and a fixed mold mounting plate (16), whereby one end of each threaded spindle is mounted in the fixed mold mounting plate (16) and is configured as a piston (9) of a hydraulic piston and cylinder unit. The pistons are mounted in the fixed mold mounting plate (16) in hydraulic cylinders and an increased clamping force is created for the platen clamping mechanism by an appropriate impingement of the piston (9). In addition, the invention provides a detachable anti-rotation mechanism (23) for the threaded spindles (15). The invention thus allows an inclined position of the mold mounting plates (3, 16) to be corrected, by the targeted rotation of one or more threaded spindles.

6 Claims, 2 Drawing Sheets

PLATEN CLAMPING MECHANISM FOR AN INJECTION-MOLDING MACHINE

BACKGROUND OF THE INVENTION

The invention relates to a platen clamping unit for an injection molding machine of a type set forth in the preamble of claim 1.

Such platen clamping units are generally known in plastics injection molding machines or in injection molding machines for thixotropic metals. The moving mold mounting plate and the fixed mold mounting plate, each carry a half-mold. Firstly, the platen clamping unit has the function to move the mold mounting plates relative to one another and to thereby open or close the mold. A further function resides in the application of a high clamping force to ensure that the mold remains closed even at very high injection pressures and is prevented from moving apart. Although, it is conceivable to unite both functions in one drive unit, this however results in different demands of the construction. Movement of the plates can be implemented at relatively small force while a fairly large stroke is, however, needed; clamping requires a relatively small stroke at a high clamping force. As a consequence, it is difficult to dimension such a single drive to meet both functions.

Separate units were therefore proposed, for example, in EP 0 544 903 B1, in which a single drive implements the movement and electromagnets ensure the clamping force; a combination of ball screw and toggle lever is shown in EP 0 383 935 A1; an arrangement of toothed racks and eccentric is known from DE 195 44 329 A1.

The known techniques for the clamping force unit require cumbersome and maintenance-intense mechanisms and very high clamping forces can only be generated to a limited degree.

The so-called 2-platen clamping units afford a particular compact configuration. The conventional configuration (3-platen structure) involves the provision of a support plate in addition to the fixed mold mounting plate, whereby the moving mold mounting plate is arranged between the fixed mold mounting plate and the support plate and mechanically supported upon the support plate. When the 2-platen structure is involved, the moving mold mounting plate is supported only upon the fixed mold mounting plate. Although this constitutes a relatively compact configuration, there are, however, problems when a clamping force unit should be attached.

A platen clamping unit according to the preamble of claim 1 is known from EP 0 381 107 B1. In this conventional platen clamping units, the moving mold mounting plate is provided in the area of the ball screw with an additional hydraulic drive for applying a very high clamping force. However, this structure is mechanically very complicated and incurs high costs to implement and may introduce additional play or tolerances into the system, so that the parallelism of the mold mounting plates, required for implementing a precise operation of the platen clamping unit, cannot always be ensured.

SUMMARY OF THE INVENTION

The invention is therefore based on the object to provide a platen clamping unit which is simple and compact in design, in particular can also be configured as 2-platen clamping unit, and allows implementation of measures for providing and maintaining the parallelism of the plates.

This object is attained in accordance with the present invention by a platen clamping unit for an injection molding machine with a moving and a fixed mold mounting plate, a drive for displacing the moving mold mounting plate relative to the fixed mold mounting plate, and a clamping force unit for generating a high clamping force, wherein the drive has at least one threaded spindle with an electric motor, and the clamping force unit has at least one hydraulic piston and cylinder unit which is integrated in one of the mold mounting plates, characterized in that the threaded spindle of the threaded spindle drive is configured on one end as piston rod and supports the piston of the hydraulic piston and cylinder unit, wherein the cylinder of the piston and cylinder unit is configured in the fixed mold mounting plate.

By combining an electric drive for the movement of the moving mold mounting plate and a hydraulic apparatus for the clamping force unit, both functions can be satisfied at the same time, i.e. the movement with long travel path and small force and the application of a high clamping force at small travel path, without great mechanical complexity, when the hydraulic apparatus is integrated in the fixed mold mounting plate or attached thereto.

In this configuration, one end of the threaded spindle is designed as piston of the hydraulic piston and cylinder unit wherein the cylinder is configured in the fixed mold mounting plate. Hereby, it is advantageous, to releasably hold the threaded spindle in rotation-fixed manner and to implement the displacement of the mold mounting plate via a threaded nut.

In the configuration of the platen clamping unit according to the invention, the piston of the hydraulic apparatus is configured on one end of the threaded spindle so that additional constructive measures for integration of the hydraulic apparatus in the area of the thread of the threaded spindle can be omitted and the apparatus can be manufactured with great precision. As a result of this measure, it is possible to integrate the hydraulic apparatus in the fixed mold mounting plate, thereby also contributing to the improvement of the mechanical precision and thus to an enhancement of the plate parallelism.

Furthermore, there is preferably provided a releasable anti-rotation mechanism for the threaded spindle. When it is determined during operation that the position of the mold mounting plates is not in parallel relationship, corrective steps can be taken by releasing one or more anti-rotation mechanisms of the spindles, by turning the spindle or spindles for correction of the non-parallelism, and by subsequently locking the anti-rotation mechanism again.

Furthermore, it is proposed in accordance with the invention to bias the piston or pistons by hydraulic liquid at least during the displacement of the moving mounting plate. In this manner, the pistons are always held in a precisely defined position by the hydraulic fluid during the displacement so that this measure also ensures increased parallelism of the plates.

BRIEF DESCRIPTION OF THE DRAWING

An embodiment of the invention will be described with reference to the attached drawing.

DETAILED DESCRIPTION OF PREFERRED EMBODIMENTS

Figure 1:
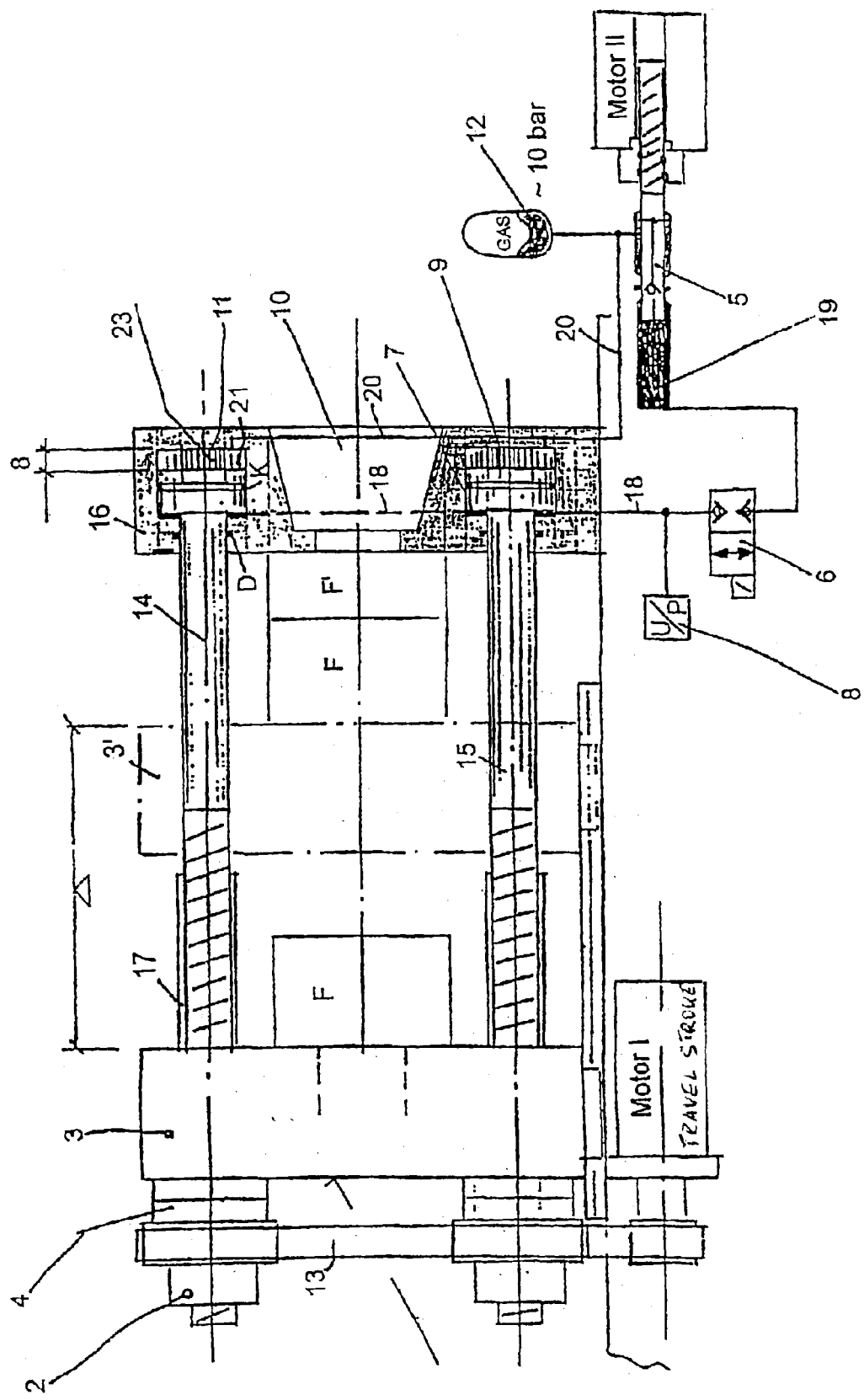
FIG. 1 shows a side view, partially broken away, of a 2-platen clamping unit according to the invention.

The 2-platen clamping unit according to FIG. 1 includes a fixed mold mounting plate 16 and a moving mold mounting plate 3. The mold mounting plates 3, 16 are connected to one another via four threaded spindles 14, 15, whereby only two threaded spindles are visible in the illustration. The threaded spindles are guided through the moving mold mounting plate.

Rotatably mounted to the moving mounting plate 3 are spindle nuts 2 which are in engagement with the threaded portion of the threaded spindles and caused to rotate by an electric motor I via a toothed belt 13. Releasable toothed holding brakes 4 are arranged between the threaded spindles 2 and the moving mounting plate 3 for producing a force-locking engagement between the mold mounting plate and the spindle nuts 2.

The ends of the threaded spindles are supported on the fixed mounting plate 16 in such a manner that they essentially cannot execute an axial movement or execute only an axial movement that is required for a locking stroke, and are secured against rotation during normal operation.

FIG. 1 shows schematically two half-molds F and F' which are supported by the moving mold mounting plate 3 and the fixed mold mounting plate 16, respectively.

The mold is closed by releasing the toothed holding brake, and by operating the motor I to operate the threaded nuts 2 via the toothed belt 13 to thereby shift the moving mold mounting plate 3 for closing the mold (to the right in the figure) via the travel stroke and the mold height compensation Δ, until the half-molds F and F' adjoin one another so that the mold is closed. The position of the moving mounting plate 3 is shown in the figure by dashdot lines 3'.

The ends of the threaded spindles, supported in the fixed mold mounting plate, are each designed as piston rods for carrying the pistons 9 of a hydraulic piston and cylinder unit, whereby the pistons are guided in cylinders formed in the mold mounting plate. Formed between the spindle-proximal surface of the piston 9 and the opposite surface of the cylinder is a pressure fluid compartment 7 which is sealed by a seal D and a piston ring K. The pressure fluid compartment 7 is in communication via suitable lines 18 and a valve 6 with a pressure fluid cylinder 19 for accommodating a displacement piston 5. The displacement piston can be shifted within the cylinder in axial direction by an electric motor II. The displacement unit may also be realized in the form of a multi-piston system, e.g. axial pumps or radial pumps. Furthermore, the pressure fluid cylinder 19 is connected to a pressure fluid reservoir (low-pressure reservoir) 12 for allowing introduction of additional pressure fluid into the cylinder.

A pressure sensor 8 is provided in the line between the valve 6 and the pressure fluid compartment 7.

The tool is, as described above, closed through operation of the motor I, whereby the pistons 9 are supported during the movement by the bottom of the pressure fluid compartment 7 (left-hand side in the figure).

This action is further promoted by the fact that the collecting space 23 is connected via the line 20 to the low-pressure reservoir which contains the hydraulic fluid under increased pressure of about 10 bar. As a consequence of the excess pressure in the collecting space 23, the pistons are reliably pressed against the bottom of the bore (left in FIG. 1) and thus assume a precise position during displacement of the moving mold mounting plate so that a tilting of the plates relative to one another is prevented.

After the toothed holding brakes 4 are closed, the switchable valve 6 is opened and the displacement piston 5 is moved in the pressure fluid cylinder 19 so that the pressure fluid flows via the lines 18 into the pressure fluid compartments 7 to act upon the pistons 9 for building up an increased clamping force and to move them (to the right in the figure), in the illustrated example in opposition to the pressure in the collecting space 23. When an adjustable end pressure is reached, which is monitored by the pressure sensor 8, the valve 6 is closed so as to maintain the clamping force and to initiate the injection and molding processes. Once the molding process is over, the valve 6 is opened and the displacement piston 5 is moved out of the cylinder 19 so that the pressure fluid flows back into the cylinder 19. Pressure fluid possibly escaping during the pressure buildup via the piston ring flows into the collecting space 23 on the side of the piston opposite to the pressure fluid compartment and is returned via the line 20 to the reservoir. A passage with check valve 22 in the displacement piston 5 ensures that possibly leaking pressure fluid is replaced via the reservoir before the next stroke of the displacement piston 5.

Arranged in the collecting space 23, mentioned above, is further an anti-rotation mechanism for the threaded spindle.

The platen clamping unit according to the invention is simple and clear in design to ensure a short, space-saving structure and affords a good accessibility for an injection assembly attached on the outer side of the fixed mold mounting plate. An ejection unit for ejecting the molded article can be attached to the outer side of the moving mold mounting plate.

The hydraulic procedure results in a very rigid clamping system that allows also compression-forming processes.

Figure 2:
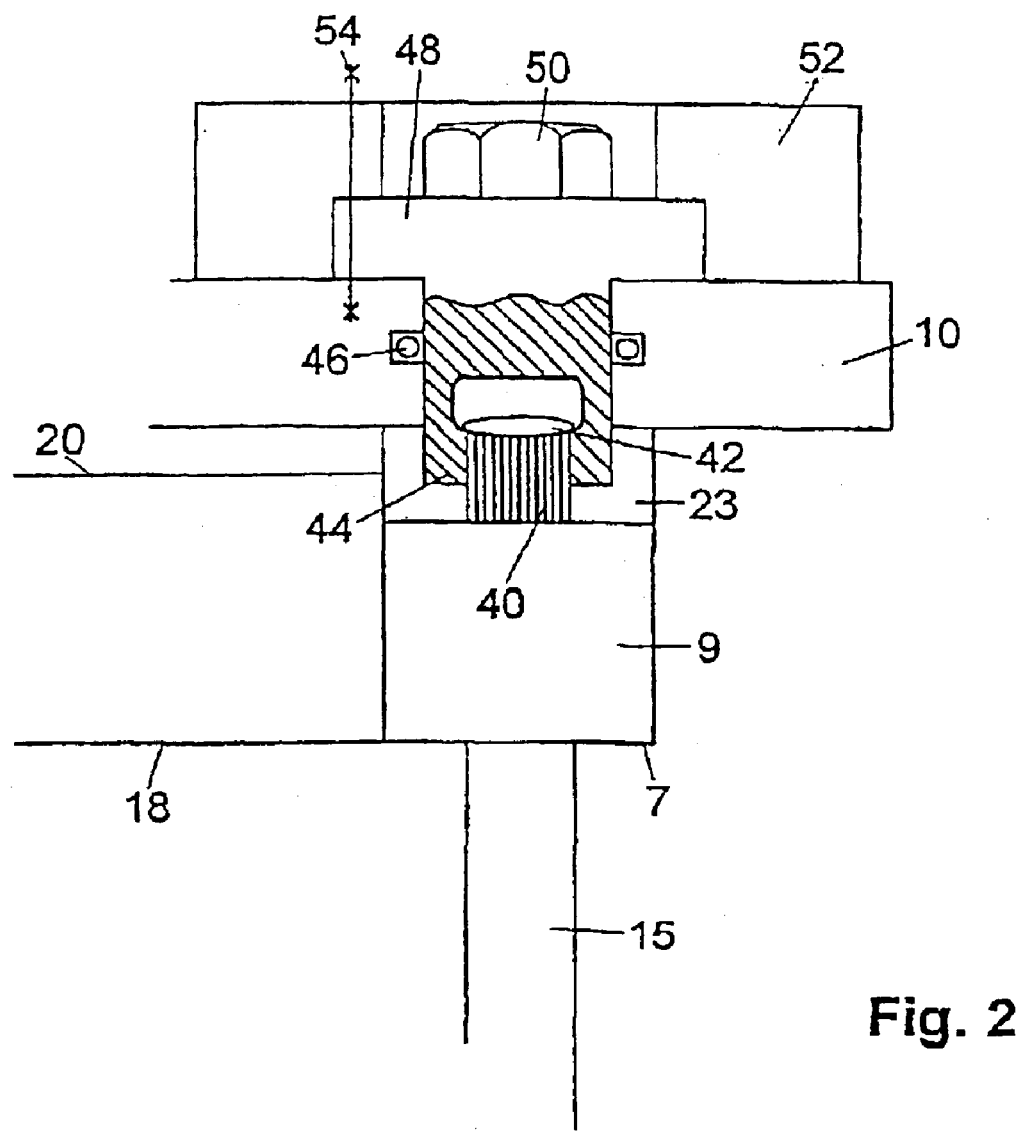
FIG. 2 shows schematically a detailed view of the piston with an anti-rotation mechanism for the spindle.

FIG. 2 shows a schematic side view of a releasable anti-rotation mechanism for the threaded spindles.

According to FIG. 2, a toothed pin element 40 is rigidly provided on the piston 9, which is connected with the threaded spindle, and has a circumference formed with longitude teeth. The toothed pin element 40 is in engagement with a cap element 44 having a recess complementing the toothed pin element 40. The recess is so dimensioned that the piston with the toothed pin element 40 can execute an axial movement in correspondence to the clamping force stroke of the piston.

The cap element 44 is formed as flange 48 on the end opposite to the recess 42 and extends through an opening in the fixed mold mounting plate 10. The flange 48 is attached to the moving mounting plate 10 by clamping elements 52 which in turn can be secured by screws 54 or the like. An actuating head 50 is rigidly provided with the cap element 44. As the cap element 44 bounds in the illustrated embodiment a part of the collecting space 23, the cap element is preferably sealed by an O-ring or the like.

When it is determined during operation of the platen clamping unit that the plates do no longer extend in precise parallel relationship or exceed a certain tolerance, the clamping or retaining elements 52, 54 on one or more threaded spindles are, optionally, loosened, and a rotation of the actuating head 50 results in a rotation of the cap element 44 so that the piston 9 is rotated with the threaded spindle 15 via the recess 42 and the toothed pin element. Hereby, the spindle nut is secured against executing a rotation so that the rotation movement of the threaded spindle is translated into a linear displacement of the attached part of the moving mold mounting plate. After correcting in this way a possible tilted position of the plates, the clamping elements 52, 54 are secured again so that the threaded spindle 15 is secured against execution of further rotation.

The mechanics is overload-proof, as a consequence of each spindle carrying precisely a quarter of the clamping force, is characterized by a high degree of plate parallelism and allows a vertical construction.

The platen clamping unit can be basically also configured as 3-platen clamping unit. In this case, the plate 3 is a fixed support plate, and the plate 16 is designed as moving mold mounting plate which is moved via the spindles by the support plate against a fixed mold mounting plate (to the right in the figure for closing the mold).

It is also principally possible to restrain the threaded nuts from executing a rotation and to rotate the threaded spindle; this construction, however, would be more complicated as far as a sealing of the pressure fluid compartments is concerned so that the illustrated embodiment appears to be more advantageous.

It is also possible to use toothed rack drives instead of the threaded spindle drive, whereby the toothed racks carry in analogous manner the hydraulic pistons on one end.

The technical dimensioning of the platen clamping unit is generally known to the artisan so that a detailed description is omitted here. Purely by example, it can be assumed that the maximum locking stroke δ is about 5 mm for the clamping force unit.

What is claimed is:

1. A platen clamping unit for an injection molding machine, comprising:
    a moving mold mounting plate:
    a fixed mold mounting plate;
    a spindle drive for displacing the moving mold mounting plate relative to the fixed mold mounting plate, said spindle drive including at least one threaded spindle having one end configured as a piston rod, and an electric motor;
    a clamping force unit for generating a clamping force, said clamping force unit including at least one hydraulic piston and cylinder unit which is fitted in one of the mold mounting plates and has a cylinder and a piston, which is guided in the cylinder, wherein the piston rod of the threaded spindle supports the piston of the hydraulic piston and cylinder unit; and
    an anti-rotation mechanism acting on one end of the piston and having an actuating head to allow a turning of the threaded spindle, when the anti-rotation mechanism is released.

2. The platen clamping unit of claim 1, wherein the threaded spindle is movably supported by the releasable anti-rotation mechanism in the fixed mold mounting plate and has a threaded portion which extends through the moving mold mounting plate and through a threaded nut rotatably mounted at the moving mold mounting plate and driven by the electric motor.

3. The platen clamping unit of claim 2, and further comprising a releasable toothed holding brake mounted between the threaded nut and the moving mold mounting plate.

4. The platen clamping unit of claim 1, wherein the anti-rotation mechanism has a toothed pin element, which is part of the piston, and a cap element, which is detachably secured to the fixed mold mounting plate and has a recess which complements the toothed pin element, wherein the toothed pin element is shiftable in the recess at least by a distance of a piston stroke of the clamping force unit.

5. The platen clamping unit of claim 4, wherein the spindle drive includes a plurality of said threaded spindle.

6. An injection molding machine, comprising a platen clamping unit having a moving mold mounting plate, a fixed mold mounting plate, a spindle drive for displacing the moving mold mounting plate relative to the fixed mold mounting plate, said spindle drive including at least one threaded spindle having one end configured as a piston rod, and an electric motor, a clamping force unit for generating a clamping force, said clamping force unit including at least one hydraulic piston and cylinder unit which is fitted in one of the mold mounting plates and has a cylinder and a piston, which is guided in the cylinder, wherein the piston rod of the threaded spindle supports the piston of the hydraulic piston and cylinder unit, and an anti-rotation mechanism acting on one end of the piston and having an actuating head to allow a turning of the threaded spindle, when the anti-rotation mechanism is released.

\* \* \* \* \*